May 2, 1939.　　　W. R. STEELE　　　2,156,319
ELECTRICAL TESTING INSTRUMENT
Filed June 26, 1937
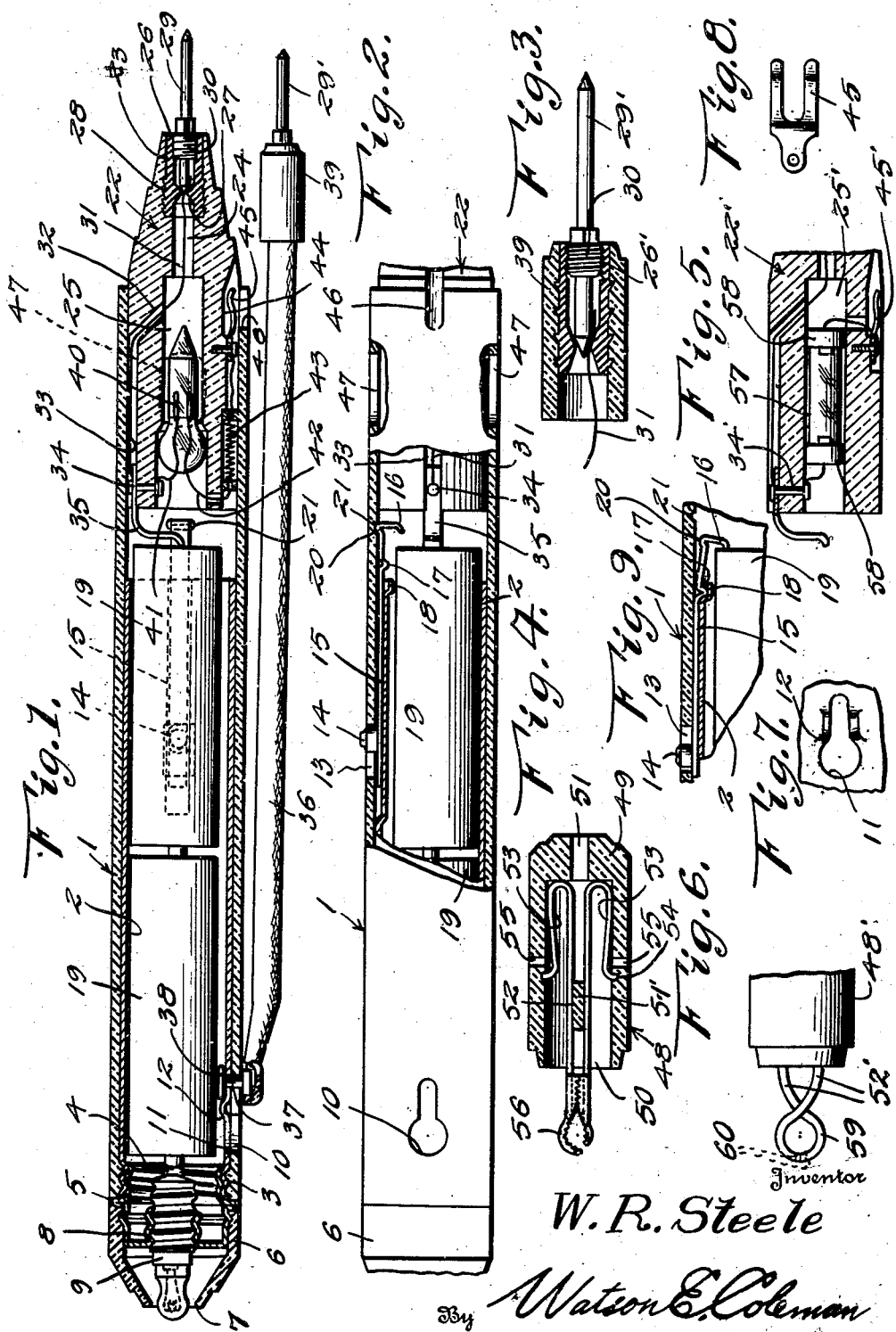
Inventor
W. R. Steele
By Watson E. Coleman
Attorney Patented May 2, 1939

2,156,319

UNITED STATES PATENT OFFICE 2,156,319

ELECTRICAL TESTING INSTRUMENT

Walter R. Steele, Lemon Grove, Calif.

Application June 26, 1937, Serial No. 150,642

4 Claims. (Cl. 175—183)

This invention relates to electrical devices and pertains particularly to a testing or "troubleshooting" device.

The primary object of the present invention is to provide an electrical tester or trouble indicating instrument which combines in a single unit a handy flashlight or trouble light, a means for testing continuity in electric circuits, a voltage and polarity indicator, and a resonance indicator for use in radio work.

Another object of the invention is to provide an instrument of the above described character which, due to certain novel constructional features, is embodied in a compact form so that it may be readily carried in the pocket.

A still further object of the invention is to provide in a trouble indicating instrument of the character referred to a novel detachable connection by means of which a lead wire may be readily coupled electrically with either of two terminals for use in making two distinct tests with the instrument, such as testing for continuity in an electrical circuit, and testing by means of a neon tube built into the device, for voltage and polarity in either a direct or alternating current circuit.

A still further object of the invention is to provide a novel form of tester tip wherein the tip when secured in place in a holding body, may at the same time firmly secure in an electrical connection with itself one end of an electric current carrying wire forming a part of the device.

Still another object of the invention is to provide in an instrument having a fixed tester tip and a movable tip, a novel supplementary tip adapted for electrical connection with one of the first mentioned tips, whereby the tips may be secured to a wire, terminal post, or other electric current carrying unit so that the user of the device may have his hands free for other work.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a longitudinal sectional view thru the complete instrument embodying the present invention.

Fig. 2 is a view partly in longitudinal section and partly in elevation of the casing portion of the instrument.

Fig. 3 is a view in longitudinal section through a test tip.

Fig. 4 is a view in longitudinal section through a test tip connector.

Fig. 5 is a longitudinal sectional view of a modified form of a portion of the instrument.

Fig. 6 shows a modification of the test tip connector.

Fig. 7 is a detail of a portion of the casing shell.

Fig. 8 is a view in elevation of a connector clip.

Fig. 9 is a view showing the sliding contact in operative position.

Referring now more particularly to the drawing, the numeral 1 designates the housing or casing of the present device which is formed of some suitable insulation material such as fibre, Bakelite or the like and which is relatively long and of circular cross-sectional design in simulation of the usual flashlight casing. Secured within and extending throughout a major portion of the length of the casing is a tubular or metallic lining 2 which at one end is threadably engaged with the wall of the casing and is interiorly formed to provide screw threads 3. This threaded portion 3 of the lining has threadably engaged therewith the metal sleeve 4 which intermediate its ends is provided with the surrounding flange 5 which normally bears against the end of the casing 1 and maintaining a portion of the sleeve 4 extended beyond the adjacent end of the casing. This extended portion of the sleeve has threadably coupled therewith the cap 6 which is open at its outer end, as indicated at 7. The outer end of the sleeve 4 is formed to provide a threaded collar or socket 8 for the reception of the threaded base portion of an electric incandescent light 9, and when this light is threaded in position in the socket and the cap 6 is threaded onto the extended end of the sleeve 4, the bulb portion of the electric light or lamp will be in position to project light rays through the opening 7 when the lamp is energized.

Adjacent the end of the casing 1 nearest the lamp 9, the casing wall is provided with the keyhole slot 10 and immediately above this slot the lining 2 has a similarly formed slot 11 therein, and the portions of the metal lining bordering the narrow part of this latter slot 11 are pressed or sprung inwardly on each side, as indicated at 12, for a purpose to be hereinafter described.

Adjacent the transverse center of the casing 1 is an opening 13 which is elongated longitudinally of the casing and is provided to receive the button 14 which is carried by the metallic switch strip 15 which is interposed between the lining 2 and the inner side of the casing 1. This strip 15 has one end extended beyond the end of the lining and turned to form the inwardly projecting contact finger 16. Adjacent the finger the strip 15 has the inwardly pressed tip 17 which, when the strip 15 is shifted in one direction is adapted to ride into a receiving depression 18 formed in the lining 2 so as to frictionally hold the contact and strip in the shifted position.

One or more electric batteries or dry cells 19 are placed in the casing and within the cylindrical lining 2 with the terminal of one battery in electrical contact with the center terminal of the electric lamp 9 and the opposite terminal of the battery positioned so that when the contact strip 15 is shifted toward the lamp 9 the finger 16 will be brought into electrical contact therewith and thus complete an electric circuit through the sleeve 4 to one side of the lamp and out of the opposite side of the lamp to and through the battery or batteries back to the terminal finger 16.

It is preferred that the sliding contact strip 15 be formed prior to its installation with a longitudinal bow so that when it has been placed between the lining 2 and the wall of the casing 1, it will exert a sufficient pressure against these two bodies to hold it against accidental movement. This action will be supplemented by the use of the struck-out portion 17 and the recess 18 for holding the strip in circuit-closing position when the button 14 is shifted in the proper direction.

If desired the strip 15 may also be provided with an outwardly struck portion or lug 20 which may engage in the notch or recess 21 in the adjacent surface of the casing wall when the contact strip has been shifted in a direction to break the electric circuit formed for energizing the lamp 9.

Inserted into the opposite end of the casing 1 is an elongated body of insulation material which is indicated by the numeral 22. This body has an outer tapering end portion in which a longitudinal bore is formed, as indicated at 23, and this bore communicates by means of the central passage 24, with a chamber 25 formed in the body and opening through the inner end thereof.

Secured in any suitable manner in the bore 23 is a metallic sleeve 26, which is interiorly threaded adjacent its outer end and adjacent its inner end is provided with a constricted portion 27 which forms a substantially conical shoulder as shown. While any suitable means may be employed for securing the sleeve 26 in place, it is preferred that it be provided with a series of prongs 28 arranged to point toward one end of the sleeve and thus when the sleeve is forcibly inserted into the bore 23 with the prongs directed toward the outer end of the bore, it will be seen that they will operate to prevent the removal of the sleeve.

The numeral 29 indicates a fixed tester tip which is pointed at one end and which at its other end or adjacent thereto has the enlarged threaded portion 30 which is adapted to engage in the threaded portion of the sleeve 26. The end of the tester tip adjacent the threaded portion 30 is tapered so as to seat on the conical shoulder formed at 27 and by this arrangement an end of a current conducting wire may be firmly secured in electrical connection with the tip 29 by placing the end between the shoulder 27 and the tapered inner end of the top and then threading this tapered end in until it compresses the end of the wire against the shoulder. Such a wire, as indicated by the numeral 31, is carried through the passage 24 through the lateral passage 32 into the channel 33 which extends along one side of the insulation body 22. If the wire 31 is of the multiple strand type, then a particularly effective electrical connection may be established between the inner end of the tip 29 and the sleeve 26 by fraying out the end of the wire and spreading the strands on the shoulder 27 so that the tapered inner end of the tip will enter the center of the group of strands and compress them at different points against the shoulder.

Adjacent the inner end of the groove 33 an electric terminal in the form of a rivet 34 is secured which passes from the groove through the material of the body 22 and into the chamber 25. This rivet has the other or inner end of the wire 31 electrically connected therewith and it also secures one end of a resilient battery supporting and contact arm 35. This arm extends across the end of the body 22 and terminates adjacent the center of the same and is adapted to press against the adjacent end of the electric cell or battery 19. The arm performs the double function of constantly forcing the cell or cells into firm electrical contact with the end of the lamp 9 and also provides an electrical connection between one side of the battery wall and the wire 31 which leads to the tester tip 29. The numeral 36 designates an insulation covered electric wire of the high-tension type, one end of which is electrically secured to the head of a button 37. This button has an inner or base portion 38 which is connected with the head by a narrow intermediate web and the base of the button is adapted to be inserted into the larger part of the key-hole slots 10 and 11 and then shifted into the narrower portion of these slots so that the base will be made to firmly electrically connect with the sprung-up portion 12 of the lining 2 and thus electrically couple the wire 36 therewith. At the opposite end of this wire 36 a metallic collar is located and has the end of the wire frictionally engaged therein. This collar is indicated by the numeral 39 and has secured therein the metallic sleeve 26' which is a duplicate of the sleeve 26 previously referred to and which also carries a tester tip 29' and secured in the same manner in the sleeve.

The elements of the instrument thus far described provide first a flashlight of usual construction, and second a means of testing continuity in an electric circuit. The operation of the device as a flashlight will be obvious, and in using the device as a continuity tester, it will be apparent that by placing the tester tips 29 and 29' on two parts of a wire or some other element in an electric circuit in which a break is suspected, current will flow, if the suspected break does not exist, between the points where the tips are placed, from one tip through the spring arm 35, the battery or dry cell and the electric lamp, back through the lining 2 and through the wire 36 to the other tip 29' and thru the suspected portion of the electric circuit to the original or first mentioned tip 29.

Housed in the chamber 25 is a small neon bulb 40. Such a bulb has two electrodes, as is well known, and one of these is electrically connected by the wire 41 with the terminal rivet 34, while the other electrode is connected by the wire 42 with one side of a resistance 43 which is housed in a suitable recess in the side of the insulation body 22 and in an area of the same where it will be covered by the casing 1. This resistance is preferably in the form of a small strip resistor of about one-half by three-sixteenth inch and having a resistance of about fifty thousand ohms, but the value of the strip will, of course, depend upon the neon lamp used.

Adjacent the resistance unit 43 a recess 44 is formed in the side of the body 22 and secured to the body in a position to lie over this recess is a slotted spring contact 45. The slot in this contact is directed towards the adjacent end of the casing 1 and the wall of the casing is provided with a slot 46 which corresponds with the slot 45 so as to permit the insertion of the terminal button 37 for electrical connection with the strip 45. This strip is electrically coupled with the other side of the resistance unit 43.

When it is desired to use the device as an indicator of the approximate voltage in an electric circuit, the terminal button 37 is slipped into the slot 46 with the base portion 38 lying against the inner side of the slotted contact 45. The portions of this contact on either side of the slot are preferably bowed inwardly slightly so that a firm electrical connection will be established with the button base 38. The tips 29 and 29' are then employed as points or terminals for bringing current in to the neon glow lamp 40 and carrying it back to its source, and the approximate voltage of current passing through the lamp will be indicated by the brightness of the glow developed. This portion of the instrument will indicate if there is a voltage, unless the same is very low, whether the same as of A. C. or D. C. type and the polarity. It will also indicate the approximate frequency of an alternating current and may also be used for locating faults in radio testing, as for instance, shorted condensers and for resonance indications in radio broadcasting equipment and wave meters. In testing a direct current line one only of the two electrodes of the glow lamp will glow when current flows therethrough and both electrodes will glow when the current is of the alternating variety and the frequency of current will be indicated by the frequency of the flicker developed in the lamp.

In order that the operation of the glow lamp may be readily seen, the casing is provided with one or more window openings 47 and the wall of the body 22 may be provided with a similar opening which leads into the chamber 25, or instead of forming this chamber as a bore in the inner end of the body 22, it may be in the form of a longitudinally extending slot which is carried through from one side of the body to the other, in which case the window opening 47 will be located over one open side of the slot.

In making tests, it is frequently of advantage for the person using the instrument to have both hands free and in order to facilitate the use of the instrument and still have the hands free for other work, there are provided two tester clips, one of which is illustrated in Fig. 4, and indicated generally by the numeral 48. This clip consists of a short cylindrical body 49 of insulation material having a relatively large bore formed therein from one end, as indicated at 50, and a small bore 51 formed longitudinally in the other end and entering the large bore. Extending across the bore 50 is a partition web 51' and the bore 50 has inserted thereinto upon each side of the web 51', the electric current conductor strip 52 which is reversely bent at its inner end to form the hook portion 53, the tip 54 of which engages in a suitable notch in the wall of the bore so as to prevent the strip from being accidentally withdrawn. Adjacent each end of the hook portion 53 of each strip, the wall of the body 49 is provided with an opening 55 thru which a pin may be inserted to remove the tip 54 from the wall notch and thus permit the withdrawal of the strip. The other ends of the strips 52 extend a substantial distance beyond the adjacent end of the body 49 and each is formed as a hook 56. These hooks 56 are in opposed relation and as shown one is slightly larger than the other so that engagement of a wire or terminal post between the same may be easily effected by hooking the end of the larger hook 56 against the post and exerting a pull to effect the separation of the hooks whereupon the post may be caused to easily slip between the two opposed portions.

The auxiliary bore 51 is adapted to receive a tester tip 29 or 29' and the space between the strips 52 is slightly less than the diameter of the tester tip so that the latter will be forced into firm electrical engagement with the two strips and the tester tip clip will be firmly secured to the tester tip.

In the illustration of the tester tips the same are shown as being formed adjacent the outer end of the threaded portion 30, of polygonal cross-section whereby the tip may be easily grasped by pliers or a wrench so as to screw the inner end of the tip firmly into position against the shoulder 27. It is to be understood, however, that this particular portion of the tester tip may be in the form of a knurled head whereby the tip may be readily secured into position by hand and without requiring the use of either of the tools above referred to.

In Fig. 5, there is illustrated a slightly modified form of neon tube, the same being shown in position in a chamber 25' formed in the inner end of a body 22' which is of the same construction as the body 22. In this form the neon tube consists of a transparent cylinder 57 at each end of which is a metallic terminal 58. One of these terminals is in direct electrical connection with a slotted contact member 45' while the other terminal 58 is in direct electrical connection with the rivet 34'. In this form of neon tube the use of a resistance unit is not necessary, the tube being of suitable sturdy construction to withstand higher voltages of current than the tube previously referred to and indicated by the numeral 40. While this latter type of lamp may be preferable, it is contemplated to cover the use of both forms and the use in connection with the first mentioned form of the resistance unit.

In Fig. 6 there is illustrated a slight modification of the tester clip, indicated generally by the numeral 48. In this form the body and interior construction is the same as in the form previously described and the same will therefore be generally designated by the numeral 48' but the metallic current carrying strips extending from the end of the body and here indicated by the numerals 52' terminate in semi-circular portions 59 which have their ends in opposed relation and normally in contact and these ends are each provided with a transverse groove 60. These grooves together form a circular or other form of opening within which a wire may be engaged, and it will be seen that by arranging the grooved ends 59 of the strips in the manner illustrated they may be readily separated so as to open the slotted or grooved jaws to facilitate the placing of a wire and maintain a firm electrical connection therewith.

From the foregoing it will be readily apparent that the instrument herein described, because of the novel character of the several elements of which it is made up, may be constructed in small and compact form and also that with it a large number of tests may be made upon various types of electrical devices which would under other circumstances require a relatively large amount of equipment. It is, of course, understood that means might be worked out for changing the electrical connection of the button 37 from the lining 2 to the terminal 45 by means of a switch, but such a change-over means is undesirable because of the possibility of the user forgetting how the switch is set and burning out the electric lamp 9 by the passage of a current therethrough which was intended to pass through the neon lamp and the resistance. With the method illustrated and described for changing the connections for the wire 36, such an error cannot occur because the operator will know by the feel of the instrument how the wire 36 is connected and will at once be aware if a change should be made before making the test under consideration.

By the provision of the novel wire securing means in the tip 39, as is illustrated in detail in Fig. 3, it will be apparent that an easy and quick connection may be made between this tip and a cable such as the one indicated by the numeral 36, where the latter is of the type having a stranded wire. By removing a portion of the insulation from around the end of the stranded wire and inserting the wire with the adjacent portion of the insulation into the end of the sleeve 26', the portion of the wire which has been bared will pass through the end of the sleeve 26' past the shoulder, and when the pointed inner end of the tip 29' is threaded inwardly to engage the shoulder, it will enter the center of the end of the stranded wire and separate the strands to clamp them against the adjacent shoulder of the sleeve.

By providing the hooks 56 of the test tip clip 48 in the novel manner illustrated, it will be apparent that the hooks may be secured to a post or other body without slipping and also that by spreading the hooks apart, the wire may be inserted between the jaws which are situated inwardly of the hooks and firmly held between the teeth of the jaws.

The tongs 56 of the tip clip illustrated in Fig. 4 are preferably formed with their ends notched or provided with a semi-circular cut-out, so that the ends of these tips may be engaged securely with a terminal post. This construction is similar to the construction illustrated and described in connection with the modified form of Fig. 6.

At the inner ends of the tongs 56 the toothed jaws have their forward ends merging with curved shoulder portions, as illustrated, so as to facilitate slipping the tongs over a wire to enable the operator to secure the device to a "hot" wire without the necessity of opening the jaws with his fingers and thus running the risk of getting a shock.

I claim:

1. In an electric testing instrument, an elongated casing, an incandescent electric lamp mounted in one end thereof, an electric battery within the casing and connected at one side with one side of the lamp, said casing having a slot in the wall thereof adjacent said lamp, an electric current conductor extending from said slot to and engaging the other side of the lamp, a body secured in the other end of the casing, a testing point secured in and projecting from said body, a current carrying spring arm carried by said body and electrically engaging the other side of said battery, said arm being electrically coupled with said test point, a flexible current conductor having a test point at one end, and means at the other end of the flexible conductor for frictional engagement in said slot and electrical connection with said first electric current conductor adjacent thereto.

2. In an electric testing instrument, an elongated casing, an incandescent electric lamp mounted in one end thereof, an electric battery within the casing and connected at one side with one side of the lamp, said casing having a slot in the wall thereof adjacent said lamp, an electric current conductor extending from said slot to and engaging the other side of the lamp, a body secured in the other end of the casing, a testing point secured in and projecting from said body, a current carrying spring arm carried by said body and electrically engaging the other side of said battery, said arm being electrically coupled with said testing point, a flexible current conductor having a testing point at one end, means at the other end of the flexible conductor for frictional engagement in said slot and electrical connection with said first electric current conductor adjacent thereto, a neon glow lamp carried by said body and having two electrodes, electrical connecting means between one electrode and said first testing tip, a resilient terminal carried by the body, electrical connecting means between said resilient terminal and the other electrode of the glow lamp, and means facilitating the frictional engagement of the said other end of the resilient conductor with said resilient terminal consisting of a slot formed in the casing to permit the introduction of the said other end of the resilient conductor beneath the resilient terminal.

3. A testing instrument comprising a tubular body of insulation material, a metallic incandescent bulb socket in one end thereof, an electric current conducting metallic insert in the body electrically connected with said socket, a battery in the body, an incandescent bulb in said socket and electrically connected on one side with one side of the battery, the other side of the bulb being electrically connected to the socket, said casing having an opening therein and said insert having a keyhole slot adjacent to and corresponding with said opening, a switch strip having sliding electrical connection with said insert and adapted when in circuit-closing position to make electrical contact with the other side of the battery, a body of insulation material inserted into the other end of the tubular body, a contact finger carried by said inserted body and pressing against the said battery and having electrical connection with the said other side thereof and maintaining the battery in operative position, a rigid test point carried by said inserted body and electrically connected with said finger, a gas-filled glow lamp housed entirely in said inserted body and viewable thru a window opening formed in the sides of the tubular and inserted bodies, an electrical connection between one side of said glow lamp and said finger, a resilient terminal clip carried by the inserted body and electrically coupled with the other side of the glow lamp, and an elongated conductor having a test point at one end and a terminal button at the other end which is adapted for selective connection in said keyhole slot and with said terminal clip.

4. An instrument comprising a tubular casing of insulation, a metallic liner in the casing and terminating at one end at an end of the casing and formed to provide interior screw threads, a lamp socket metallic shell having exterior screw threads and having one end in and engaging the threads of said liner, a threaded sleeve disposed centrally of the shell and electrically connected therewith, said sleeve being adapted to receive the base of an incandescent bulb, a hood threaded onto the outer end of said shell and having an opening thru which light rays may pass from a bulb in said sleeve, switch means electrically coupled with said liner for establishing an electrical connection with one side of a battery in the liner, the other side of the battery being adapted to contact a terminal of a bulb in the sleeve, a keyhole slot formed in the casing and said liner, an insulation body inserted in the other end of the casing, a spring finger carried by said inserted body and adapted to electrically contact the said other side of said battery and to maintain the battery in position, a rigid test point carried by said inserted body and electrically connected with said finger, and a flexible current conductor carrying a test point on one end and carrying a terminal button on its other end, said button being adapted to enter said keyhole slot for electrical connection with said liner.

WALTER R. STEELE.